United States Patent [19]

Iverson et al.

[11] Patent Number: 5,852,664

[45] Date of Patent: Dec. 22, 1998

[54] DECODE ACCESS CONTROL FOR ENCODED MULTIMEDIA SIGNALS

[75] Inventors: Vaughn Iverson; Doug Brucks, both of Beaverton, Oreg.

[73] Assignee: Intel Corporation, Santa Clara, Calif.

[21] Appl. No.: 500,463

[22] Filed: Jul. 10, 1995

[51] Int. Cl.$^6$ ........................................................ H04L 9/00
[52] U.S. Cl. ................... 380/25; 380/4; 380/23; 380/49; 380/50; 340/825.31; 340/825.34
[58] Field of Search ..................... 380/3, 4, 5, 9, 380/10, 23, 25, 46, 49, 50, 59; 340/825.31, 825.34

[56] References Cited

U.S. PATENT DOCUMENTS

| | | | |
|---|---|---|---|
| 5,319,705 | 6/1994 | Halter et al. | 380/4 |
| 5,323,244 | 6/1994 | Yamaguchi et al. | 380/5 X |
| 5,369,702 | 11/1994 | Shanton | 380/4 |
| 5,613,004 | 3/1997 | Cooperman et al. | 380/4 X |
| 5,636,282 | 6/1997 | Holmquist et al. | 380/25 |

*Primary Examiner*—Bernarr E. Gregory
*Attorney, Agent, or Firm*—William H. Murray, Esq.

[57] ABSTRACT

Multimedia signals are encoded with certain values to control a user's access to the decoding of the multimedia signals. In a preferred embodiment in which the multimedia signals contain video signals, a lock word and a checksum value are encoded into each frame header of the video stream. The lock word is the result of applying a specified hash function to the checksum value for the current frame and a specified access word. A decoder will decode the encoded video signals for the current frame only if the result of applying the hash function to the access word (received from a decoding application) and the checksum value (retrieved from the frame header) is equal to the lock word (retrieved from the frame header). If the hash function result does not equal the lock word, then the decoder assumes that decode access is not permitted. In that case, the decoder will not decode the current frame and instead will send an error message to the decoding application (preferably after a specified delay).

72 Claims, 6 Drawing Sheets

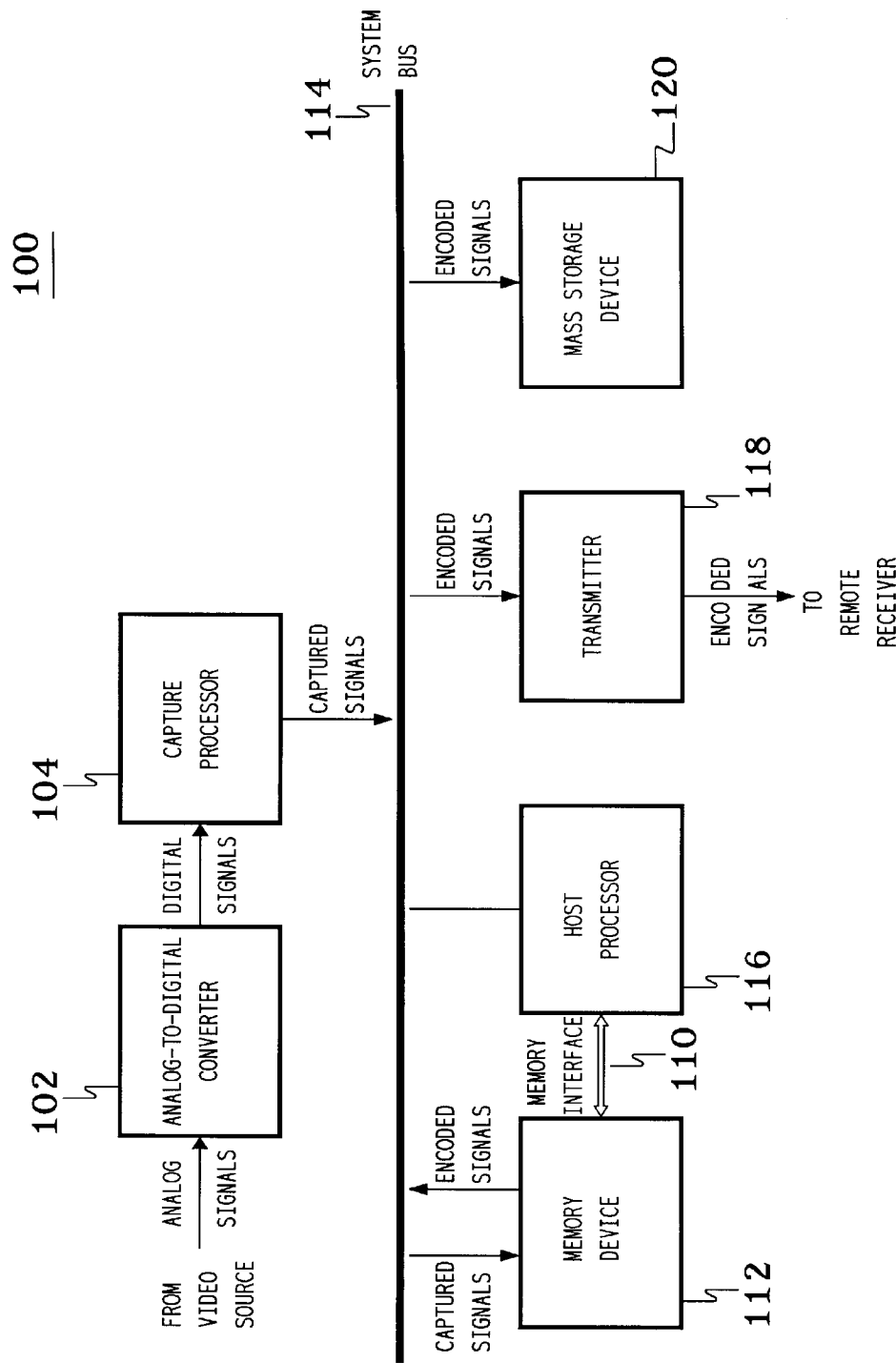
FIG. 1. ENCODING SYSTEM

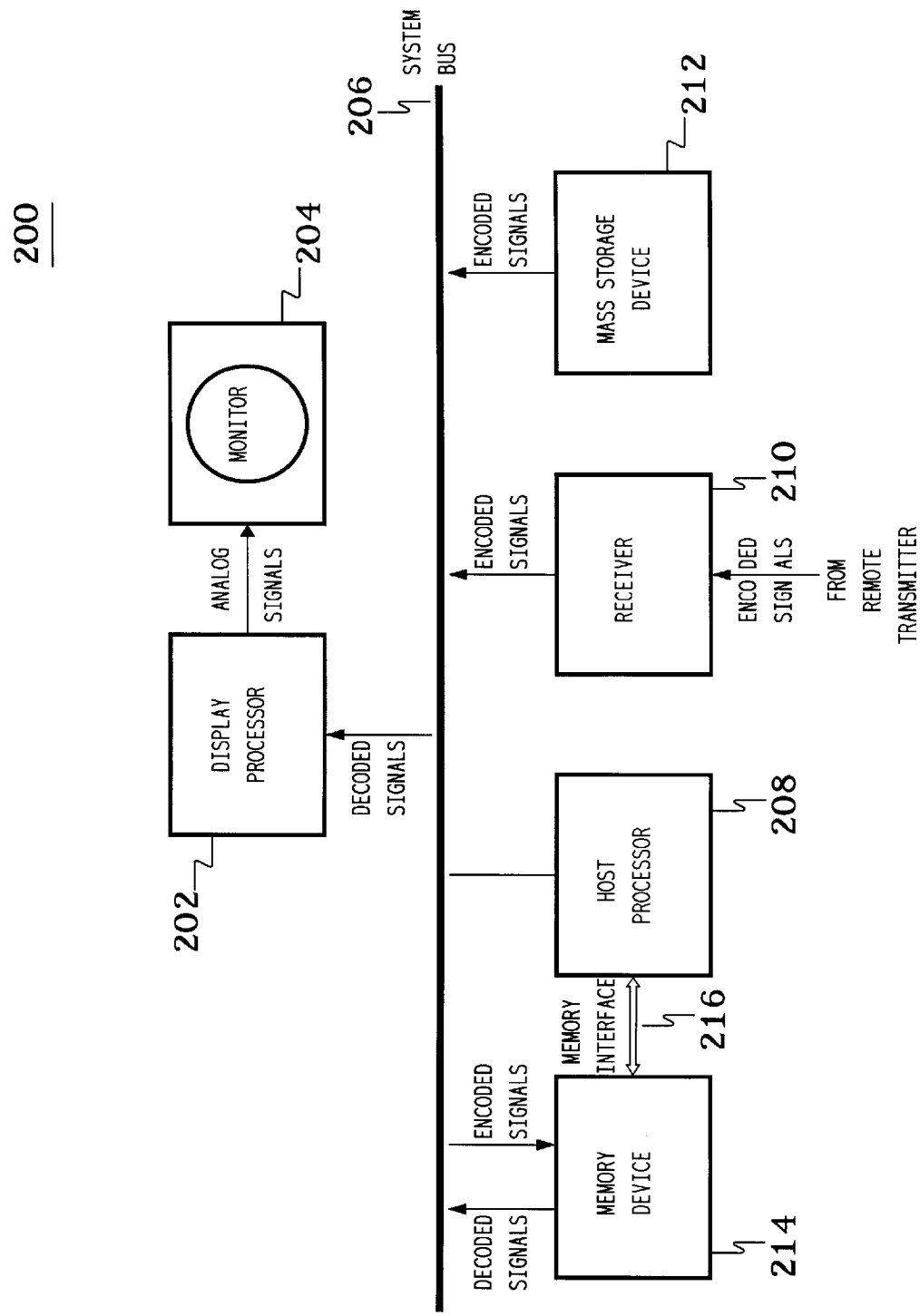
FIG. 2. DECODING SYSTEM

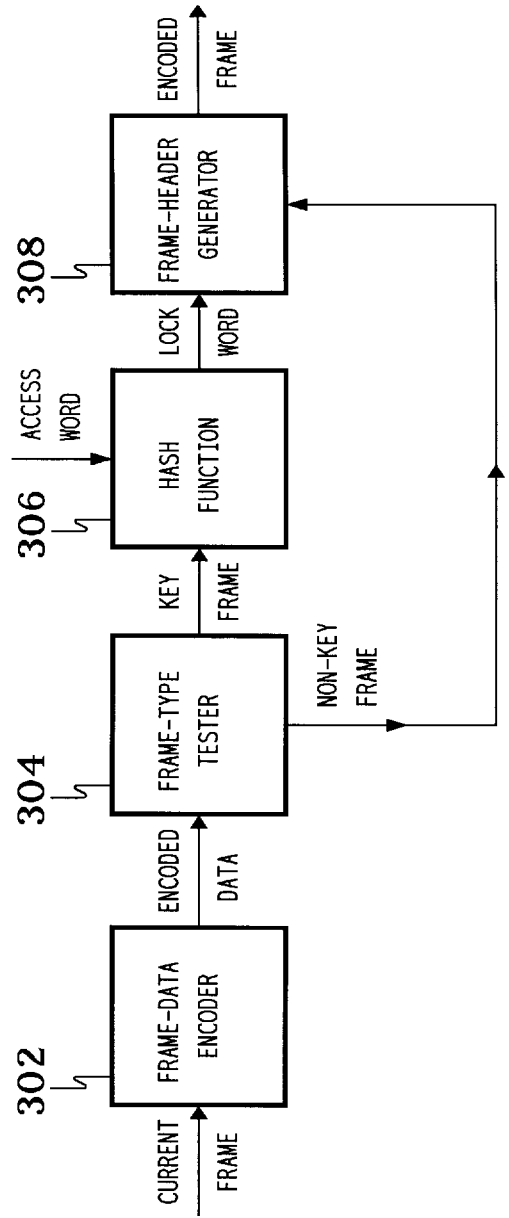
FIG. 3. VIDEO ENCODER

FIG. 4. ENCODE PROCESSING
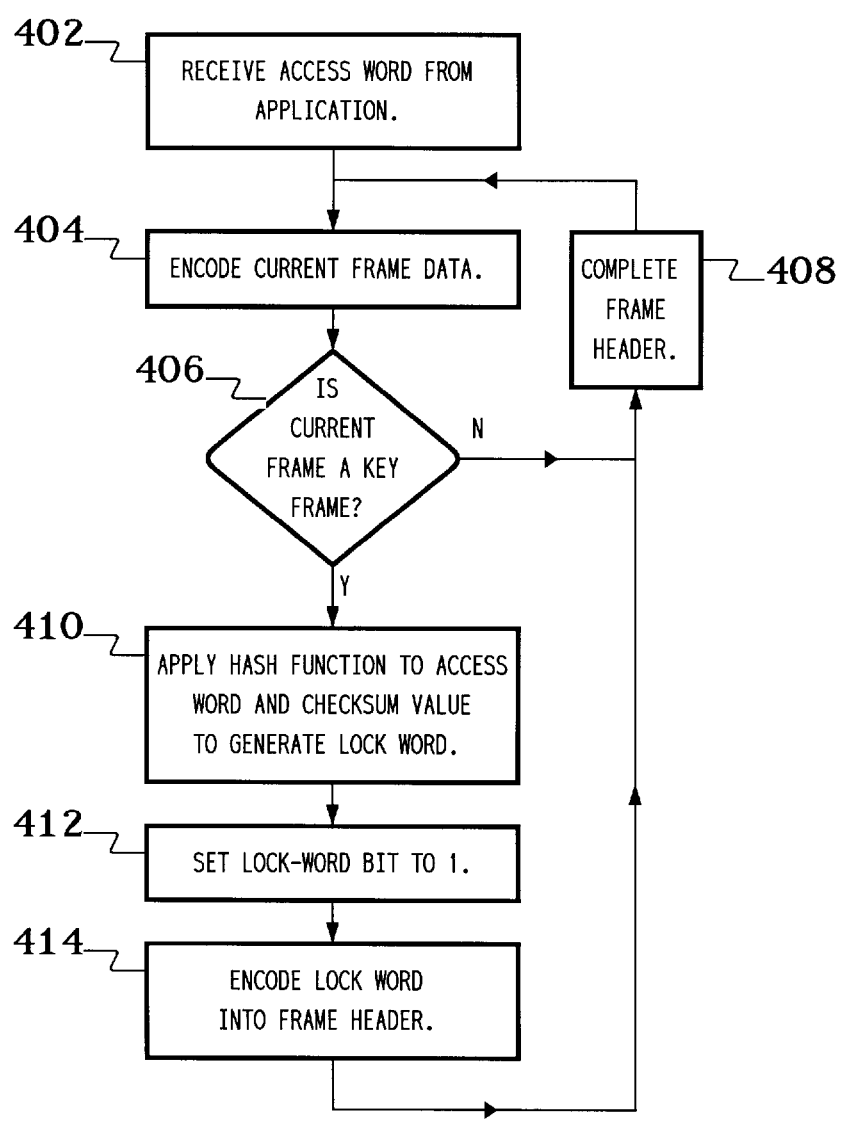

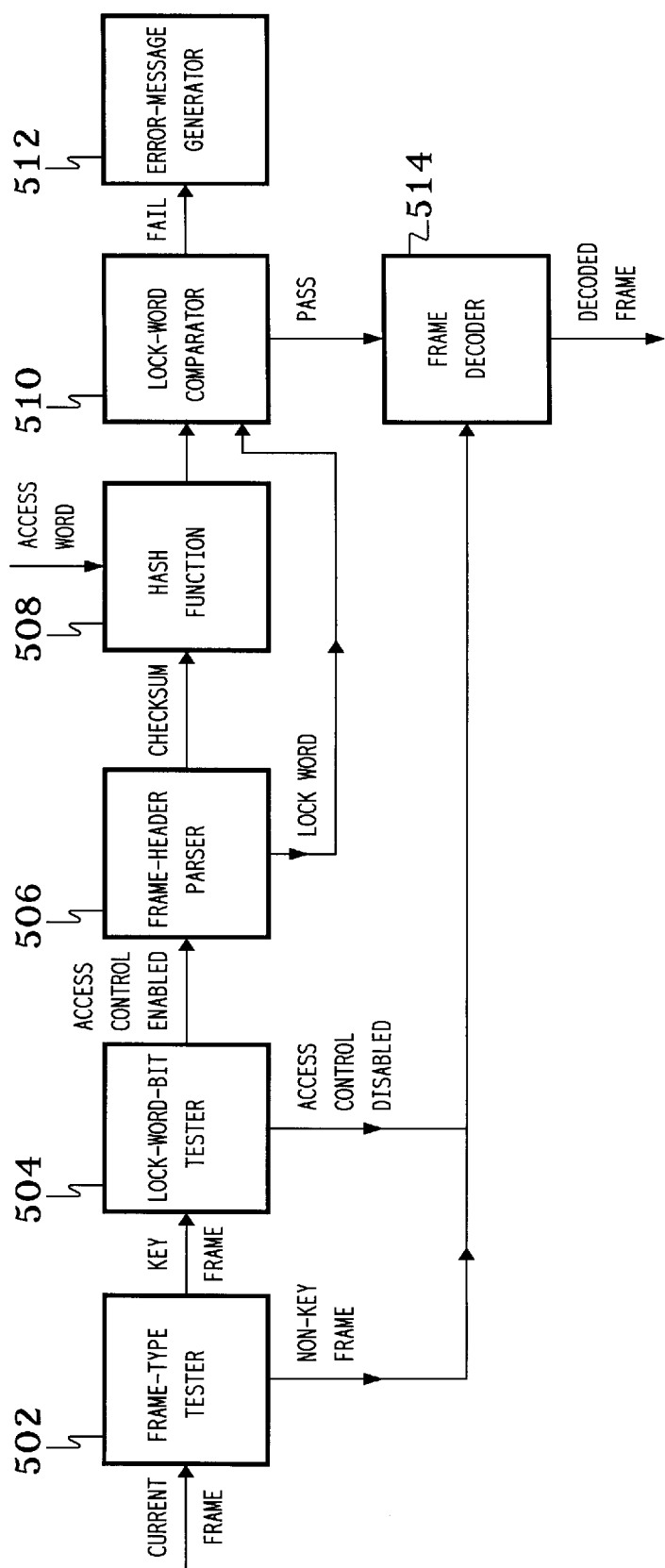
FIG. 5. VIDEO DECODER

FIG. 6. DECODE PROCESSING
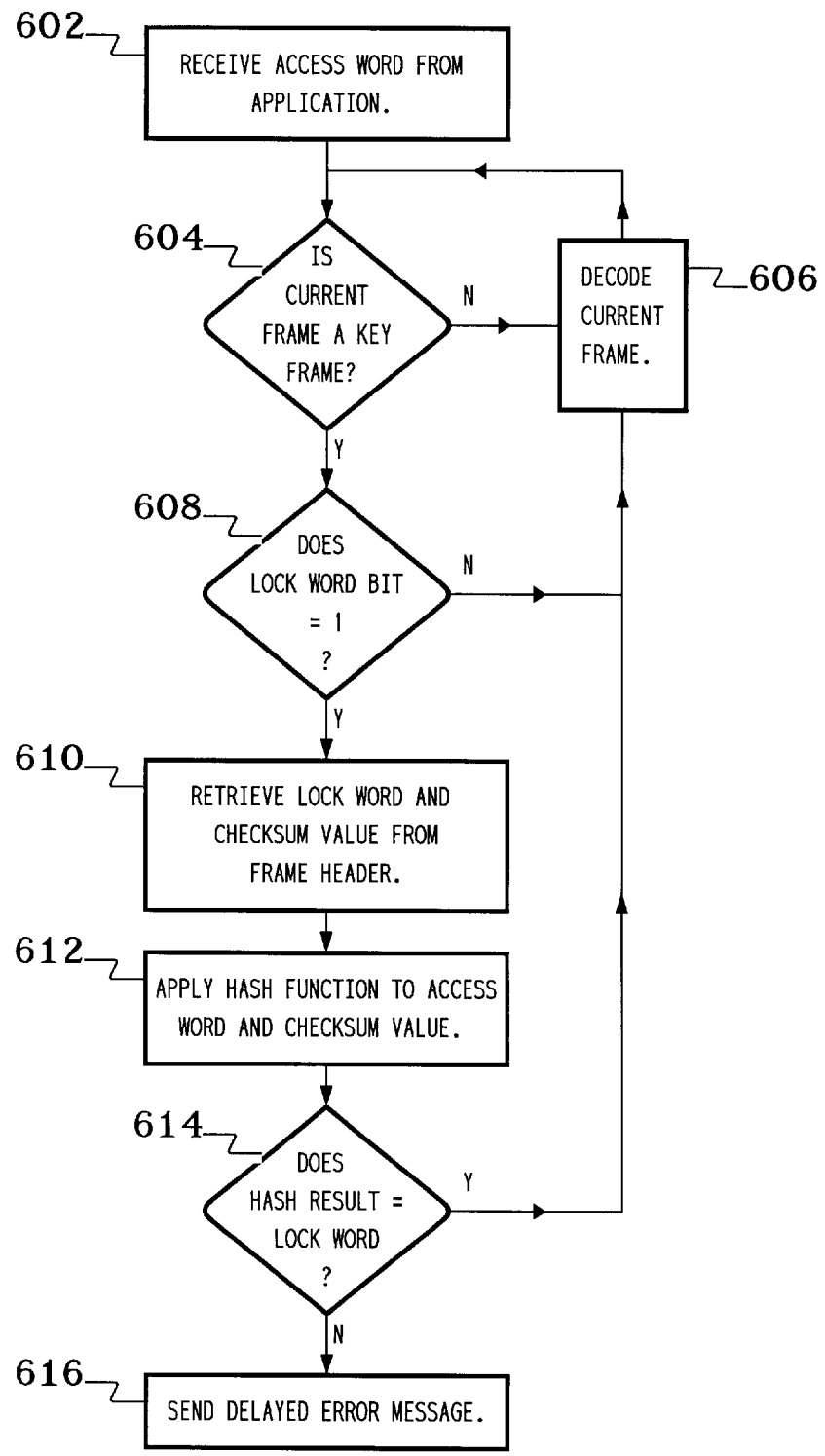

DECODE ACCESS CONTROL FOR ENCODED MULTIMEDIA SIGNALS

BACKGROUND OF THE INVENTION

1. Field of the Invention

The present invention relates to processing of multimedia signals, and, in particular, to computer-implemented methods, apparatuses, and computer programs for encoding and decoding audio and/or video signals.

2. Description of the Related Art

In certain circumstances, it is desirable to control a user's access to multimedia files. For example, a computer game may have different audio/video sequences associated with different skill levels. A person playing the computer game is supposed to demonstrate a certain level of skill at one level before being allowed to progress to the next level. Unless access to the multimedia files is controlled, a user may be able to "cheat" by playing files without having achieved the appropriate level of skill.

Another situation in which access control is desirable relates to video games having different versions. For example, a particular video game may have an R-rated version that involves the playing of audio/video sequences with explicit violence or nudity, while another version of the same video game is a G-rated version with multimedia sequences that are more appropriate for younger players. For cost reasons, it may be desirable to produce a single CD-ROM that contains the multimedia files for both versions of the video game and provide a mechanism for controlling the access to those different versions. In this case, it would be desirable, for example, to restrict the access that a young player has for playing the R-rated multimedia files.

It is an object of this invention therefore to provide a mechanism for controlling the access a user has to decode, play, and/or edit specific multimedia files.

It is a particular object to provide computer-implemented processes, apparatuses, and computer programs for encoding and decoding multimedia signals, whereby access to the decode processing is controlled.

Further objects and advantages of this invention will become apparent from the detailed description of a preferred embodiment which follows.

SUMMARY OF THE INVENTION

The present invention comprises a computer-implemented process, apparatus, and computer software for controlling access to decoding of encoded multimedia signals. According to a preferred embodiment, the encoded multimedia signals are processed to generate a first value. A first result is compared to a second result, wherein the first result is generated by applying a first function to the first value, and the second result is generated by applying a second function to a second value. The encoded multimedia signals are decoded for playback only if the first result is equal to the second result.

The present invention also comprises a computer-implemented process, apparatus, and computer software for encoding multimedia signals to control access to decoding of encoded multimedia signals. According to a preferred embodiment, the multimedia signals are received and encoded to generate the encoded multimedia signals, wherein the decoding of the encoded multimedia signals is to be accomplished by: (a) processing the encoded multimedia signals to generate a first value; (b) comparing a first result to a second result, wherein the first result is generated by applying a first function to the first value, and the second result is generated by applying a second function to a second value; and decoding the encoded multimedia signals for playback only if the first result is equal to the second result.

According to an alternative encoding embodiment, a first value is received and a first function is applied to the first value to generate a first result. The multimedia signals are encoded to generate the encoded multimedia signals, wherein the first result is encoded into the encoded multimedia signals.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a block diagram of a video system for processing video signals in a PC environment, according to one embodiment of the present invention;

FIG. 2 is a computer system for decoding the video signals encoded by the computer system of FIG. 1, according to one embodiment of the present invention;

FIGS. 3 and 4 show, respectively, a block diagram of a video encoder and a flow diagram of the processing performed by the video encoder, according to a preferred embodiment of the present invention in which the multimedia signals correspond to video signals and in which decode access control is to be enabled; and FIGS. 5 and 6 show, respectively, a block diagram of a video decoder and a flow diagram of the processing performed by the video decoder, according to a preferred embodiment of the present invention in which the encoded multimedia signals correspond to an encoded video bitstream.

DESCRIPTION OF THE PREFERRED EMBODIMENT(S)

As described above, it is desirable to provide a mechanism for controlling the access a user has to decode, play, and/or edit specific multimedia files. One possible solution is to use an operating system that is capable of marking files as "hidden" to normal file access. Under such an operating system, a user who requests a listing of the available files (e.g., by typing a "DIR" command) will be presented a list of files that omits the names of the hidden multimedia files. Another solution is to give the multimedia files "unusual" names. For example, rather than use the standard ".AVI" extension, the multimedia files could have a misleading extension such as ".BAT" or ".EXE". These solutions will thwart only the most casual of computer users. Even a user who is only moderately computer literate will be able to circumvent these schemes.

Another possible solution on the other end of the spectrum is to encrypt the multimedia files. This involves applying an encryption scheme to all of the file data to generate an encrypted file. In order to play encrypted multimedia files, the encryption process must be reversed to recover the original multimedia data. Only users with access to the decryption procedure would be able to play the encrypted files. Although such encryption would provide some degree of access control, it is impractical for systems that play streams of multimedia data. An encrypted multimedia file would have to be decrypted and stored to memory (e.g., hard drive) before being played. This may require a prohibitively expensive amount of memory space. In addition, the delays resulting from performing the decryption procedure may be undesirable for applications that are designed to play audio/video sequences to simulate real-time sound and motion.

The present invention is directed to a scheme for controlling the access that a user has to an encoded multimedia bitstream that does not suffer from the disadvantages of the aforementioned solutions. The present scheme involves a specially designed encoder that generates a specially designed multimedia bitstream for playback by a specially designed decoder. In one embodiment, the encoder uses a specified access word to generate a series of lock words. The lock words are then explicitly encoded into the multimedia bitstream. The decoder will allow a user to play the multimedia bitstream only if the user provides the correct access word to the decoder.

In a preferred embodiment in which the multimedia bitstream comprises a sequence of video frames, the encoder receives a 32-bit access word in a message from an application program that controls the encoder. For each key frame in the video sequence, the encoder generates a 16-bit checksum value using a specified checksum function. In a preferred embodiment, the checksum value is provided in the frame header for debugging purposes. The encoder generates the checksum value by applying the checksum function to the encoded data for the frame. Those skilled in the art will understand that the checksum value may be used for debugging to determine whether the data has been corrupted, e.g., by a bit flip during transmission.

The encoder then generates a 32-bit lock word for the key frame by applying a specified hash function to the access word and the checksum value. In this embodiment, the same access word is used for every key frame of the video sequence. Nevertheless, the lock word will typically be different from key frame to key frame, since the checksum value typically changes from key frame to key frame.

When the decode access control scheme of the present invention is enabled, a lock-word bit in the key frame header is set to an enabling value (e.g., 1). The enabling value indicates that the next 32 bits in the frame header correspond to the lock word for that key frame. The access control scheme can be disabled by setting the lock-word bit to a disabling value (e.g., 0). In that case, the frame header will not contain a lock word.

To play back the encoded video signals with decode access control enabled, the decoder is passed the same access word that was used by the encoder. This access word is passed to the decoder independent of the encoded multimedia bitstream and preferably in a message from an application program that controls the decoder. The decoder determines whether access control is enabled for a given key frame by retrieving and checking the value of the lock-word bit in the frame header. If access control is enabled, then the decoder retrieves the lock word and the checksum value from the frame header and applies the same hash function as used by the encoder to the access word and the checksum value. If the hash function result is the same as the lock word, then the decoder assumes that access to the key frame is permitted and the decoder proceeds to decode the key frame (and the predicted frames that depend from that key frame). On the other hand, if the hash function result does not match the lock word, then the decoder assumes that access to the key frame is not permitted and the decoder sends an error message to the application program.

In this preferred embodiment, the decode access control scheme is applied only to the key frames. Those skilled in the art will understand that, if a user is not able to decode a key frame, then the user is also precluded from decoding those predicted frames that depend on that key frame. As such, this preferred scheme effectively provides decode access control over the entire multimedia bitstream.

System Hardware Architectures

Referring now to FIG. 1, there is shown a computer system 100 for encoding video signals, according to one embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, 8-bit R, G, and B component signals).

Capture processor 104 captures the digitized component signals received from converter 102. Capturing may include one or more of color conversion (e.g., RGB to YUV), scaling, and subsampling. Each captured video frame is represented by a set of three two-dimensional component planes, one for each component of the digitized video signals. In one embodiment, capture processor 104 captures video signals in a YUV9 (i.e., YUV 4:1:1) format, in which every (4×4) block of pixels of the Y-component plane corresponds to a single pixel in the U-component plane and a single pixel in the V-component plane. Capture processor 104 selectively stores the captured signals to memory device 112 and/or mass storage device 120 via system bus 114. Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Depending upon the particular encoding scheme implemented, host processor 116 applies a sequence of compression steps to reduce the amount of data used to represent in the information in the video signals. The encoded video signals are then stored to memory device 112 via memory interface 112 and/or mass storage device 120 via system bus 114. Host processor 116 may copy the encoded video signals to mass storage device 120 and/or transmit the encoded video signals to transmitter 118 for real-time transmission to a remote receiver (not shown in FIG. 1).

Referring now the FIG. 2, there is shown a computer system 200 for decoding the video signals encoded by encoding system 100 of FIG. 1, according to one embodiment of the present invention. Encoded video signals are either read from mass storage device 212 of decoding system 200 or received by receiver 210 from a remote transmitter, such as transmitter 118 of FIG. 1. The encoded video signals are stored to memory device 214 via system bus 206.

Host processor 208 accesses the encoded signals stored in memory device 214 via high-speed memory interface 216 and decodes the encoded video signals for display. Decoding the encoded video signals involves undoing the compression processing implemented by encoding system 100 of FIG. 1.

Host processor 208 stores the decoded video signals to memory device 214 via memory interface 216 from where they are transmitted to display processor 202 via system bus 206. Alternatively, host processor 208 transmits the decoded video signals directly to display processor 202 via system bus 206. Display processor 202 processes the decoded video signals for display on monitor 204. The processing of display processor 202 includes digital-to-analog conversion of the decoded video signals. After being decoded by host processor 208 but before being D/A converted by display processor 202, the decoded video signals may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably an Intel® general-purpose microprocessor such as an Intel® i486™, Pentium™, or higher processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring now to FIG. 2, decoding system 200 is preferably a microprocessor-based PC system similar to the basic PC system of encoding system 100. In particular, host processor 208 may be any suitable means for decoding encoded video signals and is preferably an Intel® general purpose microprocessor such as an Intel® i486™, Pentium™, or higher processor. System bus 206 may be any suitable digital signal transfer device and is preferably a PCI bus. Mass storage device 212 may be any suitable means for storing digital signals and is preferably a CD-ROM device. Receiver 210 may be any suitable means for receiving the digital signals transmitted by transmitter 118 of encoding system 100. Display processor 202 may be any suitable device for processing video signals for display (including converting the digital video signals to analog video signals) and is preferably implemented through a PC-based display system such as a VGA or SVGA system. Monitor 204 may be any means for displaying analog signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the art will understand that such a combined system may be used to display decoded video signals in real-time to monitor the capture and encoding of video signals.

Encode Processing

Referring now to FIGS. 3 and 4, there are shown, respectively, a block diagram of video encoder 300 and a flow diagram of the processing performed by video encoder 300, according to a preferred embodiment of the present invention in which the multimedia signals correspond to video signals and in which decode access control is to be enabled. Video encoder 300 is preferably implemented in software on host processor 116 of FIG. 1. Encoder 300 receives an access word, for example, in a message from application program running on the host processor (step 402 of FIG. 4). Encoder 300 uses this same access word to process each frame in the video sequence, until the end of the sequence is reached or until the application program sends encoder 300 a new access word to use.

The rest of the steps of FIG. 4 are applied to each frame of the video sequence. Frame-data encoder 302 processes the current frame to generate encoded data (step 404). Those skilled in the art will understand that frame-data encoder 302 may generate the encoded frame data using standard video encoding techniques such as block-based motion estimation, block-based motion-compensated differencing (for predicted frames), block-based transformation (of pixels for key frames and of pixel differences for predicted frames), quantization of transform coefficients, run-length encoding of quantized coefficients, and Huffman-type entropy encoding of run-length codes. As part of generating the encoded frame data, frame-data encoder 302 generates a checksum value corresponding to the encoded frame data.

Frame-type tester 304 determines whether the current frame is a key frame or some other type of frame (e.g., a predicted frame) (step 406). A key frame is intra-encoded, while a predicted frame is inter-encoded with respect to at least one reference frame. If the current frame is not a key frame, then processing continues to frame-header generator 308, which generates the frame header for the current non-key frame (step 408). In this case, the lock-word bit in the frame header is set to the disabling value (e.g., 0) and the frame header does not contain a lock word. After generating the frame header, the current frame is fully encoded and processing returns to frame-data encoder 302 to repeat step 404 for the next frame in the video sequence.

If, on the other hand, frame-type tester 304 determines that the current frame is a key frame (step 406), then hash function 306 is applied to the access word (received from the application program) and the checksum value (generated by frame-data encoder 302) (step 410). In a preferred embodiment, hash function 306 is defined by the following C code:

Intermediate=(((((U32)CheckSum)+(AccessWord & 0xff00)+1)*((AccessWord>>16)+(((AccessWord & 1xff)<<8)+1)));
Intermediate=(Intermediate/(((Intermediate %((AccessWord & 0xff)+1))+1));
LockWord=(Intermediate*((Intermediate %(((U32)CheckSum & 0xff00)+1))+1));

where CheckSum is the 16-bit checksum value and AccessWord is the 32-bit access word. Intermediate and LockWord are both 32-bit unsigned integers.

Frame-header generator 308 then generates the frame header for the current key frame. In this case, the lock-word bit is set to the enabling value (e.g., 1) (step 412) and the 32-bit lock word is encoded into the frame header (step 414). Frame-header generator 308 completes the generation of the encoded frame (step 408), including encoding the checksum value into the frame header. Again, processing then returns to frame-data encoder 302 to repeat step 404 for the next frame in the video sequence.

When decode access control is to be disabled, the lock-word bit in the frame header of a key frame is set to the disabling value and the frame header does not contain a lock word.

Decode Processing

Referring now to FIGS. 5 and 6, there are shown, respectively, a block diagram of video decoder 500 and a flow diagram of the processing performed by video decoder 500, according to a preferred embodiment of the present invention in which the encoded multimedia signals correspond to an encoded video bitstream. Video decoder 500 is preferably implemented in software on host processor 208 of FIG. 2. Decoder 500 receives an access word, for example, in a message from an application program running on the host processor (step 602 of FIG. 6). Decoder 500 uses this same access word to process each frame in the video sequence, until the end of the sequence is reached or until the application program sends decoder 500 a new access word to use.

The rest of the steps of FIG. 6 are applied to each frame of the video sequence. Frame-type tester 502 determines whether the current frame is a key frame or some other type of frame (e.g., a predicted frame) (step 604). If the current frame is not a key frame, then access to decoding the current frame is presumed to be allowed and frame decoder 514 decodes the current frame for playback (e.g., for display on the monitor) (step 606). After decoding the current frame, processing returns to frame-type tester 502 to repeat step 604 for the next frame in the video sequence.

If, on the other hand, frame-type tester 502 determines that the current frame is a key frame (step 604), then lock-word-bit tester 504 retrieves the lock-word bit from the frame header and determines whether decode access control is enabled (step 608). If the lock-word bit is set to the disabling value, then decode access control is disabled and frame decoder 514 decodes the key frame (step 606). Otherwise, if the lock-word bit is set to the enabling value, then decode access control is enabled and frame-header parser 506 retrieves the 32-bit lock word and the 16-bit checksum value from the frame header (step 610).

Hash function 508 is then applied to the access word (received from the application program) and the checksum value (retrieved from the frame header) (step 612). In order for decode access control to operate properly, hash function 508 is the same as hash function 306 used by video encoder 300 of FIG. 3 to generate the lock words for the encoded multimedia signals.

Lock-word comparator 510 compares the result of performing the hash function to the lock word retrieved from the frame header by parser 506 (step 614). If the two values are equal, then decode access is presumed to be allowed and frame decoder 514 decodes the frame (step 606). If, however, hash function 508 generates a value different from the lock word, then decode access is presumed to be forbidden. In this case, error-message generator 512 sends an error message to the application program, after a delay (e.g., one frame interval) (step 616). Processing of the video sequence is then terminated. Those skilled in the art will understand that one reason for adding a delay before sending the error message is to make it more difficult for someone to circumvent the decode access control scheme by sequentially trying every possible value for the 32-bit access word.

Discussion of Preferred Embodiment

This present invention allows authors of compressed video sequences and other multimedia streams to control playback and editing of their video assets. With this invention, multimedia content developers can control how their video content is used once it is distributed via CD-ROM or other media. These title developers are able to restrict the playback and editing of these sequences by applications other than the intended software packages.

For example, the present decode access control scheme allows a software developer to keep secret the video content in a CD-ROM computer game until the player has attained the proper skill level in the game play. This is done by "locking-out" the ability of external media browsers to play this content. Similarly, this capability may be used to enforce parental control measures on entertainment packages which contain "mature content." Finally, and perhaps most importantly, it allows developers to make it difficult for users to infringe on the copyrights of software packages. This invention allows copyright owners to inhibit unauthorized attempts, using conventional means, to play back or edit protected video sequences. The invention provides protection from all but the most determined hackers, while causing no significant increase in video decode time.

A purpose of this invention is to provide decode access control over video streams that is computationally simple, and yet difficult to overcome. Under the invention, if the decoding application is not authorized to play the video, it will either provide the wrong access word, or no access word at all, which will disable the decoder for the video sequence.

The use of the lock word in the key frame header serves at least two purposes. First, it encodes the hashed version of the access word that will be provided by the decoding application. Second, it makes the decode access control resistant to bitstream tampering by disallowing the possibility of simply turning off the key frame lock-word bit. If this bit is turned off, but the 32-bit lock word field remains, the bitstream becomes corrupted and undecodable. To disable this protection by turning off the key frame lock-word bit would require a bit aligned reconstruction of each frame's picture header (to remove the 32-bit lock word) and adjustment of the overall frame size as coded, which is also encoded in the bitstream header. This is a complicated task that is well beyond the capability of even the most sophisticated file editors, and which is virtually impossible without detailed knowledge of the construction of the bitstream.

The computationally simple method employed to hash the access word has several advantages. First, it produces a lock word that differs for each encoded frame, which makes the key frame lock-word field much more difficult to detect. Second, it ties the value of the lock word to a value and calculation which occur in seemingly unrelated parts of the bitstream and decoder, respectively. In the process of rejecting an access word, the decoder will fully decode the picture header of the frame to get the checksum value required to calculate the hash code. It would be preferable, in addition, for the decoder to decode at least a subset of the frame's encoded data (e.g., the Y-component data) before actually testing the access word against the lock word. In such an embodiment, only after this operation completes (covering thousands of machine instructions) will the comparison take place which results in the error and refusal to decode. To even a determined and knowledgeable hacker tracing through the code execution, this will appear to be some kind of checksum error or other internal consistency failure. Without detailed knowledge of the bitstream, and sophisticated multimedia and custom file editing tools, this method will be very difficult to overcome.

Alternative Embodiments

FIGS. 3–6 represent one possible embodiment of the present invention. Those skilled in the art will understand that other embodiments also fall within the scope of the present invention.

In the embodiment of FIGS. 3–6, decode access control is applied only to key frames. In an alternative embodiment of the present invention, decode access control is applied to every frame (e.g., all intra-encoded frames and all inter-encoded frames). Those skilled in the art will understand that, under this alternative embodiment, frame-type tester 304 may be omitted from video encoder 300 of FIG. 3, step 406 may be omitted from the encode processing of FIG. 4, frame-type tester 502 may be omitted from video decoder 500 of FIG. 5, and step 604 may be omitted from the decode processing of FIG. 6.

In the preferred embodiment of FIGS. 3–6, the multimedia signals are video signals. In alternative embodiments, the multimedia signals may comprise other types of signals, such as, for example, audio, graphics, alpha channels for blending, and streams of 3D graphics primitives, or combinations of those different types of signals.

As described earlier, decode access control can be used in any number of different applications. It can be used to control a user's access to multimedia files stored in memory devices, such as CD-ROMs or hard drives. It can also be used to control access to multimedia streams that are received by a decoding system in real-time applications, such as audio/video conferencing, broadcasting, or multicasting.

Video encoders and decoders of the present invention can perform hash functions different from hash function 306 of FIG. 3 presented earlier in this specification in the section entitled "Encode Processing." Those skilled in the art will understand that preferred hash functions for the present invention have a number of characteristics. They are practically non-invertible and, at the least, have no simple mathematical inverse. They exhibit little correlation between inputs and outputs. For example, a small input (i.e., access word or checksum value) does not necessarily imply a small output (i.e., lock word). Given a lock word and a checksum value, there are very few access keys that map to the same lock word, for all possible checksum values. Moreover, the checksum value does not constrain the range of lock words to some small range of values.

In the preferred embodiment of FIGS. 3–6, the inputs to the hash function are the access word and the checksum value for the current frame. In alternative embodiments, the second input need not be the checksum value. The second input could be another value related to the encoded frame data (e.g., the size of the encoded frame in bytes). Alternatively, the second input could be a value that is unrelated to the frame data. For example, the second input could be generated by a random-number generator that uses a seed value known to both the encoder and decoder. As described in the following paragraphs, still other embodiments may not even have a second input to the hash function.

In the preferred embodiment of FIGS. 3–6, decode access control is implemented by encoding two values (i.e., the lock word and the checksum value) into the frame header of each key frame in the multimedia bitstream. In addition, a third value (i.e., the access word) is passed to the decoder independent of the bitstream. Before decoding the bitstream, the decoder determines whether decode access is permitted. It does so by applying a function (i.e., the hash function) to one of the two values from the bitstream (i.e., the checksum value) and the third value (i.e., the access word). If the result of applying that function (i.e, the hash result) is equal to the second value from the bitstream (i.e., the lock word), then decode access is assumed to be permitted and the bitstream is decoded. Those skilled in the art will understand that other mechanisms for providing decode access control to multimedia streams fall within the scope of the present invention.

As a first example, the encoder encodes a first value, which it receives from the encoding application program, into the bitstream. The decoder then receives a second value from the decoding application independent of the bitstream, retrieves the first value from the bitstream, and performs decode access control by ensuring that the first value (retrieved from the bitstream) is equal to the second value (received from the decoding application) before allowing the bitstream to be decoded.

As a second example, the encoder encodes the first value, which it receives from the encoding application program, into the bitstream. The decoder then receives the second value from the decoding application independent of the bitstream, retrieves the first value from the bitstream, and applies a specified function to the first value. The decoder performs decode access control by ensuring that the result of applying the function to the first value (retrieved from the bitstream) is equal to the second value (received from the decoding application) before allowing the bitstream to be decoded.

As a third example, the encoder encodes the first value, which it receives from the encoding application program, into the bitstream. The decoder then receives the second value from the decoding application independent of the bitstream, retrieves the first value from the bitstream, applies a first specified function to the first value, and applies a second specified function to the second value. The decoder performs decode access control by ensuring that the result of applying the function to the first value (retrieved from the bitstream) is equal to the result of applying the second function to the second value (received from the decoding application) before allowing the bitstream to be decoded.

As a fourth example, the encoder encodes the first value, which it receives from the encoding application program, into the bitstream. The decoder then receives the second value from the decoding application independent of the bitstream, retrieves the first value from the bitstream, and applies a specified function to the second value. The decoder performs decode access control by ensuring that the first value (retrieved from the bitstream) is equal to the result of applying the function to the second value (received from the decoding application) before allowing the bitstream to be decoded. Those skilled in the art will recognize that this fourth example covers the preferred embodiment of FIGS. 3–6, wherein the first value is the lock word, the second value is access word, and the function is the hash function (which also happens to have the checksum value as a second input).

These four examples can be generalized into a single procedure as follows. The encoder receives the first value and applies an encoding function to the first value to generate a first result. The encoder encodes the first result into the multimedia bitstream. The decoder receives a second value, retrieves the first result from the bitstream, applies a first function to the first result, and applies a second function to the second value. The decoder performs decode access control by ensuring that the result of applying the first function is equal to the result of applying the second function before allowing the bitstream to be decoded.

The general procedure covers the first example, where the encoding function, the first function, and the second function are all identity functions. For purposes of this specification, an identity function is a function that returns its input value. That is, the output of applying an identity function to an input is always equal to the input (i.e., $f(x)=x$). An identity function is preferable implemented as no function at all. A non-identity function, on the other hand, is a function that does not return its input value for each possible input value. That is, the output of applying a non-identity function to an input is not equal to the input for at least one possible input value (i.e., $f(x) \neq x$ for at least one x).

Similarly, the general procedure described above covers the second example, where the first function is a non-identity function, and the encoding and second functions are both identity functions. The general procedure covers the third example, where the encoding function is an identity function, and the first and second functions are both non-identity functions. Lastly, the general procedure covers the fourth example, where the first function is an identity function, and the encoding and second functions are non-identity function.

The present invention can be embodied in the form of computer-implemented processes and apparatuses for practicing those processes, as well as in the form of storage media, such as floppy diskettes, CD-ROMs, hard drives, or any other computer-readable storage medium, encoded with machine-readable computer program code, wherein, when the computer program is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for controlling access to decoding of encoded multimedia signals, comprising the step of:
   a. processing the encoded multimedia signals to generate a first value;
   b. comparing a first result to a second result, wherein:
      the first result is generated by applying a first function to the first value; and
      the second result is generated by applying a second function to a second value, the second value received from an application program; and
   c. decoding the encoded multimedia signals for playback only if the first result is equal to the second result.

2. The process of claim 1, wherein:
   the first function is an identity function; and
   the second function is a non-identity function.

3. The process of claim 2, wherein:
   the first value is a lock word;
   the second value is an access word;
   the second function is a hash function;
   step (a) comprises the steps of:
      (1) receiving the access word;
      (2) retrieving the lock word from the encoded multimedia signals, wherein the first result is equal to the lock word; and
      (3) receiving a third value;
   step (b) comprises the steps of:
      (1) generating the second result by applying the hash function to the access word and the third value; and
      (2) comparing the lock word to the second result; and
   step (c) comprises the step of decoding the encoded multimedia signals for playback only if the lock word is equal to the second result.

4. The process of claim 3, wherein the third value is retrieved from the encoded multimedia signals.

5. The process of claim 4, wherein:
   the third value is a checksum value; and
   step (a)(3) comprises the step of retrieving the checksum value from the encoded multimedia signals.

6. The process of claim 4, wherein:
   step (a)(2) comprises the step of retrieving the lock word from a frame header of the encoded multimedia signals; and
   step (a)(3) comprises the step of retrieving the third value from the frame header.

7. The process of claim 6, wherein step (a)(2) comprises the step of retrieving the lock word from the frame header only if a lock word bit in the frame header is set to an enabling value.

8. The process of claim 3, wherein step (c) further comprises the step of transmitting a delayed error message if the lock word is not equal to the second result.

9. The process of claim 1, wherein:
   the first value is a lock word;
   the second value is an access word;
   the first function is an identity function;
   the second function is a hash function;
   step (a) comprises the steps of:
      (1) receiving the access word in a message from a decoding application;
      (2) retrieving the lock word from a frame header of the encoded multimedia signals only if a lock word bit in the frame header is set to an enabling value, wherein the first result is equal to the lock word; and
      (3) retrieving a checksum value from the frame header;
   step (b) comprises the steps of:
      (1) generating the second result by applying the hash function to the access word and the checksum value; and
      (2) comparing the lock word to the second result; and
   step (c) comprises the steps of:
      (1) decoding the encoded multimedia signals for playback only if the lock word is equal to the second result; and
      (2) transmitting a delayed error message if the lock word is not equal to the second result.

10. An apparatus for controlling access to decoding of encoded multimedia signals, comprising:
   (a) means for processing the encoded multimedia signals to generate a first value;
   (b) means for comparing a first result to a second result, wherein:

the first result is generated by applying a first function of the first value; and the second result is generated by applying a second function to a second value, the second value received from an application program; and (c) means for decoding the encoded multimedia signals for playback only if the first result is equal to the second result.

11. The apparatus of claim 10, wherein:

the first function is an identity function; and the second function is a non-identity function.

12. The apparatus of claim 11, wherein:

the first value is a lock word;

the second value is an access word;

the second function is a hash function;

means (a):
(1) receives the access word;
(2) retrieves the lock word from the encoded multimedia signals, wherein the first result is equal to the lock word; and
(3) receives a third value;

means (b):
(1) generates the second result by applying the hash function to the access word and the third value; and
(2) compares the lock word to the second result; and means (c) decodes the encoded multimedia signals for playback only if the lock word is equal to the second result.

13. The apparatus of claim 12, wherein the third value is retrieved from the encoded multimedia signals.

14. The apparatus of claim 13, wherein:

the third value is a checksum value; and means (a) retrieves the checksum value from the encoded multimedia signals.

15. The apparatus of claim 13, wherein:

means (a) retrieves the lock word from a frame header of the encoded multimedia signals; and means (a) retrieves the third value from the frame header.

16. The apparatus of claim 15, wherein means (a) retrieves the lock word from the frame header only if a lock word bit in the frame header is set to an enabling value.

17. The apparatus of claim 12, wherein means (c) transmits a delayed error message if the lock word is not equal to the second result.

18. The apparatus of claim 10, wherein:

the first value is a lock word;

the second value is an access word;

the first function is an identity function;

the second function is a hash function;

means (a):
(1) receives the access word in a message from a decoding application;
(2) retrieves the lock word from a frame header of the encoded multimedia signals only if a lock word bit in the frame header is set to an enabling value, wherein the first result is equal to the lock word; and
(3) retrieves a checksum value from the frame header;

means (b):
(1) generates the second result by applying the hash function to the access word and the checksum value; and
(2) compares the lock word to the second result; and means (c):
(1) decodes the encoded multimedia signals for playback only if the lock word is equal to the second result; and
(2) transmits a delayed error message if the lock word is not equal to the second result.

19. A storage medium encoded with machine-readable computer program code for controlling access to decoding of encoded multimedia signals, comprising:

(a) means for causing a computer to process the encoded multimedia signals to generate a first value:

(b) means for causing the computer to compare a first result to a second result, wherein:
the first result is generated by applying a first function to the first value; and
the second result is generated by applying a second function to a second value the second value received from an application program; and (c) means for causing the computer to decode the encoded multimedia signals for playback only if the first result is equal to the second result.

20. The storage medium of claim 19, wherein:

the first function is an identity function; and the second function is a non-identity function.

21. The storage medium of claim 20, wherein:

the first value is a lock word;

the second value is an access word;

the second function is a hash function;

means (a):
(1) causes the computer to receive the access word;
(2) causes the computer to retrieve the lock word from the encoded multimedia signals, wherein the first result is equal to the lock word; and
(3) causes the computer to receive a third value;

means (b):
(1) causes the computer to generate the second result by applying the hash function to the access word and the third value; and
(2) causes the computer to compare the lock word to the second result; and means (c) causes the computer to decode the encoded multimedia signals for playback only if the lock word is equal to the second result.

22. The storage medium of claim 21, wherein the third value is retrieved from the encoded multimedia signals.

23. The storage medium of claim 22, wherein:

the third value is a checksum value; and means (a) causes the computer to retrieve the checksum value from the encoded multimedia signals.

24. The storage medium of claim 22, wherein:

means (a) causes the computer to retrieve the lock word from a frame header of the encoded multimedia signals; and means (a) causes the computer to retrieve the third value from the frame header.

25. The storage medium of claim 24, wherein means (a) causes the computer to retrieve the lock word from the frame header only if a lock word bit in the frame header is set to an enabling value.

26. The storage medium of claim 21, wherein means (c) causes the computer to transmit a delayed error message if the lock word is not equal to the second result.

27. The storage medium of claim 19, wherein:

the first value is a lock word;

the second value is an access word;

the first function is an identity function;
the second function is a hash function;
means (a):
- (1) causes the computer to receive the access word in a message from a decoding application;
- (2) causes the computer to retrieve the lock word from a frame header of the encoded multimedia signals only if a lock word bit in the frame header is set to an enabling value, wherein the first result is equal to the lock word; and
- (3) causes the computer to retrieve a checksum value from the frame header;

means (b):
- (1) causes the computer to generate the second result by applying the hash function to the access word and the checksum value; and
- (2) causes the computer to compare the lock word to the second result; and means (c):
- (1) causes the computer to decode the encoded multimedia signals for playback only if the lock word is equal to the second result; and
- (2) causes the computer to transmit a delayed error message if the lock word is not equal to the second result.

28. A computer-implemented process for encoding multimedia signals to control access to decoding of encoded multimedia signals, comprising the steps of:
- (1) receiving the multimedia signals; and
- (2) encoding the multimedia signals to generate the encoded multimedia signals, wherein the decoding of the encoded multimedia signals is to be accomplished by:
  - (a) processing the encoded multimedia signals to generate a first value;
  - (b) comparing a first result to a second result, wherein:
    - the first result is generated by applying a first function to the first value; and
    - the second result is generated by applying a second function to a second value, the second value received from an application program; and
  - (c) decoding the encoded multimedia signals for playback only if the first result is equal to the second result.

29. The process of claim 28, wherein:
the first function is an identity function; and
the second function is a non-identity function.

30. The process of claim 29, wherein:
the first value is a lock word;
the second value is an access word;
the second function is a hash function;
step (a) comprises the steps of:
- (1) receiving the access word;
- (2) retrieving the lock word from the encoded multimedia signals, wherein the first result is equal to the lock word; and
- (3) retrieving a third value;

step (b) comprises the steps of:
- (1) generating the second result by applying the hash function to the access word and the third value; and
- (2) comparing the lock word to the second result; and step (c) comprises the step of decoding the encoded multimedia signals for playback only if the lock word is equal to the second result.

31. The process of claim 30, wherein the third value is retrieved from the encoded multimedia signals.

32. The process of claim 31, wherein:
the third value is a checksum value; and
step (a)(3) comprises the step of retrieving the checksum value from the encoded multimedia signals.

33. The process of claim 31, wherein:
step (a)(2) comprises the step of retrieving the lock word from a frame header of the encoded multimedia signals; and
step (a)(3) comprises the step of retrieving the third value from the frame header.

34. The process of claim 33, wherein step (a)(2) comprises the step of retrieving the lock word from the frame header only if a lock word bit in the frame header is set to an enabling value.

35. The process of claim 30, wherein step (c) further comprises the step of transmitting a delayed error message if the lock word is not equal to the second result.

36. The process of claim 28, wherein:
the first value is a lock word;
the second value is an access word;
the first function is an identity function;
the second function is a hash function;
step (a) comprises the steps of:
- (1) receiving the access word in a message from a decoding application;
- (2) retrieving the lock word from a frame header of the encoded multimedia signals only if a lock word bit in the frame header is set to an enabling value, wherein the first result is equal to the lock word; and
- (3) retrieving a checksum value from the frame header;

step (b) comprises the steps of:
- (1) generating the second result by applying the hash function to the access word and the checksum value; and
- (2) comparing the lock word to the second result; and step (c) comprises the steps of:
- (1) decoding the encoded multimedia signals for playback only if the lock word is equal to the second result; and
- (2) transmitting a delayed error message if the lock word is not equal to the second result.

37. An apparatus for encoding multimedia signals to control access to decoding of encoded multimedia signals, comprising:
- (1) means for receiving the multimedia signals; and
- (2) means for encoding the multimedia signals to generate the encoded multimedia signals, wherein the decoding of the encoded multimedia signals is to be accomplished by:
  - (a) processing the encoded multimedia signals is to be accomplished by:
  - (b) comparing a first result to a second result, wherein:
    - the first result is generated by applying a first function to the first value; and
    - the second result is generated by applying a second function to a second value, the second value received from an application program; and
  - (c) decoding the encoded multimedia signals for playback only if the first result is equal to the second result.

38. The apparatus of claim 37, wherein:
first function is an identity function, and
the second function is a non-identity function.

39. The apparatus of claim 38, wherein:

the first value is a lock word;

the second value is an access word;

the second function is a hash function;

step (a) comprises the steps of:
(1) receiving the access word;
(2) retrieving the lock word from the encoded multimedia signals, wherein the first result is equal to the lock word; and
(3) retrieving a third value;

step (b) comprises the steps of:
(1) generating the second result by applying the hash function to the access word and the third value; and
(2) comparing the lock word to the second result; and step (c) comprises the step of decoding the encoded multimedia signals for playback only if the lock word is equal to the second result.

40. The apparatus of claim 39, wherein the third value is retrieved from the encoded multimedia signals.

41. The apparatus of claim 40, wherein:
the third value is a checksum value; and
step (a)(3) comprises the step of retrieving the checksum value from the encoded multimedia signals.

42. The apparatus of claim 40, wherein:
step (a)(2) comprises the step of retrieving the lock word from a frame header of the encoded multimedia signals; and
step (a)(3) comprises the step of retrieving the third value from the frame header.

43. The apparatus of claim 42, wherein step (a)(2) comprises the step of retrieving the lock word from the frame header only if a lock word bit in the frame header is set to an enabling value.

44. The apparatus of claim 39, wherein step (c) further comprises the step of transmitting a delayed error message if the lock word is not equal to the second result.

45. The apparatus of claim 37, wherein:
the first value is a lock word;
the second value is an access word;
the first function is an identity function;
the second function is a hash function;
step (a) comprises the steps of:
(1) receiving the access word in a message from a decoding application;
(2) retrieving the lock word from a frame header of the encoded multimedia signals only if a lock word bit in the frame header is set to an enabling value, wherein the first result is equal to the lock word; and
(3) retrieving a checksum value from the frame header;

step (b) comprises the steps of:
(1) generating the second result by applying the hash function to the access word and the checksum value; and
(2) comparing the lock word to the second result; and step (c) comprises the steps of:
(1) decoding the encoded multimedia signals for playback only if the lock word is equal to the second result; and
(2) transmitting a delayed error message if the lock word is not equal to the second result.

46. A storage medium encoded with machine-readable computer program code for encoding multimedia signals to control access to decoding of encoded multimedia signals, comprising:
(1) means for causing a computer to receive the multimedia signals; and
(2) means for causing the computer to encode the multimedia signals to generate the encoded multimedia signals, wherein the decoding of the encoded multimedia signals is to be accomplished by:
(a) processing the encoded multimedia signals to generate a first value;
(b) comparing a first result to a second result, wherein:
the first result is generated by applying a first function to the first value; and
the second result is generated by applying a second function to a second value, the second value received from an application program; and
(c) decoding the encoded multimedia signals for playback only if the first result is equal to the second result.

47. The storage medium of claim 46, wherein:
first function is an identity function; and
the second function is a non-identity function.

48. The storage medium of claim 47, wherein:
the first value is a lock word;
the second value is an access word;
the second function is a hash function;
step (a) comprises the steps of:
(1) receiving the access word;
(2) retrieving the lock word from the encoded multimedia signals, wherein the first result is equal to the lock word; and
(3) retrieving a third value;

step (b) comprises the steps of:
(1) generating the second result by applying the hash function to the access word and the third value; and
(2) comparing the lock word to the second result; and step (c) comprises the step of decoding the encoded multimedia signals for playback only if the lock word is equal to the second result.

49. The storage medium of claim 48, wherein the third value is retrieved from the encoded multimedia signals.

50. The storage medium of claim 49, wherein:
the third value is a checksum value; and
step (a)(3) comprises the step of retrieving the checksum value from the encoded multimedia signals.

51. The storage medium of claim 49, wherein:
step (a)(2) comprises the step of retrieving the lock word from a frame header of the encoded multimedia signals; and
step (a)(3) comprises the step of retrieving the third value from the frame header.

52. The storage medium of claim 51, wherein step (a)(2) comprises the step of retrieving the lock word from the frame header only if a lock word bit in the frame header is set to an enabling value.

53. The storage medium of claim 48, wherein step (c) further comprises the step of transmitting a delayed error message if the lock word is not equal to the second result.

54. The storage medium of claim 46, wherein:
the first value is a lock word;
the second value is an access word;
the first function is an identity function;
the second function is a hash function;
step (a) comprises the steps of:
(1) receiving the access word in a message from a decoding application;
(2) retrieving the lock word from a frame header of the encoded multimedia signals only if a lock word bit in the frame header is set to an enabling value, wherein the first result is equal to the lock word; and
(3) retrieving a checksum value from the frame header;

step (b) comprises the steps of:

(1) generating the second result by applying the hash function to the access word and the checksum value; and (2) comparing the lock word to the second result; and step (c) comprises the steps of:

(1) decoding the encoded multimedia signals for playback only if the lock word is equal to the second result; and (2) transmitting a delayed error message if the lock word is not equal to the second result.

55. A computer-implemented process for encoding multimedia signals to control access to decoding of encoded multimedia signals, comprising the steps of:

(a) receiving an access word;

(b) generating a lock word, including:
   (1) generating a value, and
   (2) applying a hash function to the access word and the value to generate the lock word; and (c) encoding the multimedia signals to generate the encoded multimedia signals, wherein the lock word is inserted into the encoded multimedia signals.

56. The process of claim 55, wherein step (b)(1) comprises the step of processing the multimedia signals to generate the value.

57. The process of claim 56, wherein:

the value is a checksum value; and step (b)(1) comprises the step of processing the multimedia signals to generate the checksum value.

58. The process of claim 56, wherein step (c) comprises the step of encoding the lock word and the third value into a frame header of the encoded multimedia signals.

59. The process of claim 58, wherein step (c) comprises the step of encoding a lock word bit into the frame header with an enabling value to indicate that the lock word is present in the frame header.

60. The process of claim 55, wherein:

The multimedia signals comprise at least one of video signals and audio signals;

step (a) comprises the step of receiving the access word in a message from an encoding application;

the value is a checksum value, and step (b)(1) includes processing the multimedia signals to generate the checksum value; and step (c) comprises the steps of:
   (1) encoding the lock word and the checksum value into a frame header of the encoded multimedia signals, and
   (2) encoding a lock word bit into the frame header with an enabling value to indicate that the lock word is present in the frame header.

61. An apparatus for encoding multimedia signals to control access to decoding of encoded multimedia signals, comprising:

(a) means for receiving an access word;

(b) means for generating a lock word, including:
   (1) means for generating a value, and
   (2) means for applying a hash function to the access word and the value to generate the lock word; and (c) means for encoding the multimedia signals to generate the encoded multimedia signals, wherein the lock word is inserted into the encoded multimedia signals.

62. The apparatus of claim 61, wherein means (b) processes the multimedia signals to generate the value.

63. The apparatus of claim 62, wherein:

the third value is a checksum value; and means (b) processes the multimedia signals to generate the checksum value.

64. The apparatus of claim 62, wherein means (c) encodes the lock word and the third value into a frame header of the encoded multimedia signals.

65. The apparatus of claim 64, wherein means (c) encodes a lock word bit into the frame header with an enabling value to indicate that the lock word is present in the frame header.

66. The apparatus of claim 61, wherein:

The multimedia signals comprise at least one of video signals and audio signals;

means (a) receives the access word in a message from an encoding application;

the value is a checksum value, and means (b)(1) processes the multimedia signals to generate the checksum value; and means (c):
   (1) encodes the lock word and the checksum value into a frame header of the encoded multimedia signals, and
   (2) encodes a lock word bit into the frame header with an enabling value to indicate that the lock word is present in the frame header.

67. A storage medium having stored thereon machine-readable program code for encoding multimedia signals to control access to decoding of encoded multimedia signals wherein, when the program code is executed by a computer, the computer implements the steps of:

(a) receiving an access word;

(b) generating a lock word, including:
   (1) generating a value, and
   (2) applying a hash function to the access word and the value to generate the lock word; and (c) encoding the multimedia signals to generate the encoded multimedia signals, wherein the lock word is inserted into the encoded multimedia signals.

68. The storage medium of claim 67, wherein means (b) causes the computer to process the multimedia signals to generate the value.

69. The storage medium of claim 68, wherein:

the third value is a checksum value; and step (b) causes the computer to process the multimedia signals to generate the checksum value.

70. The storage medium of claim 68, wherein step (c) causes the computer to encode the lock word and the third value into a frame header of the encoded multimedia signals.

71. The storage medium of claim 70 wherein step (c) causes the computer to encode a lock word bit into the frame header with an enabling value to indicate that the lock word is present in the frame header.

72. The recording medium of claim 67, wherein:

The multimedia signals comprise at least one of video signals and audio signals;

means (a) causes the computer to receive the access word in a message from an encoding application;

the value is a checksum value, and means (b)(1) causes the computer to process the multimedia signals to generate the checksum value; and means (c):
   (1) causes the computer to encode the lock word and the checksum value into a frame header of the encoded multimedia signals, and
   (2) causes the computer to encode a lock word bit into the frame header with an enabling value to indicate that the lock word is present in the frame header.

* * * * *